Patented Nov. 25, 1952

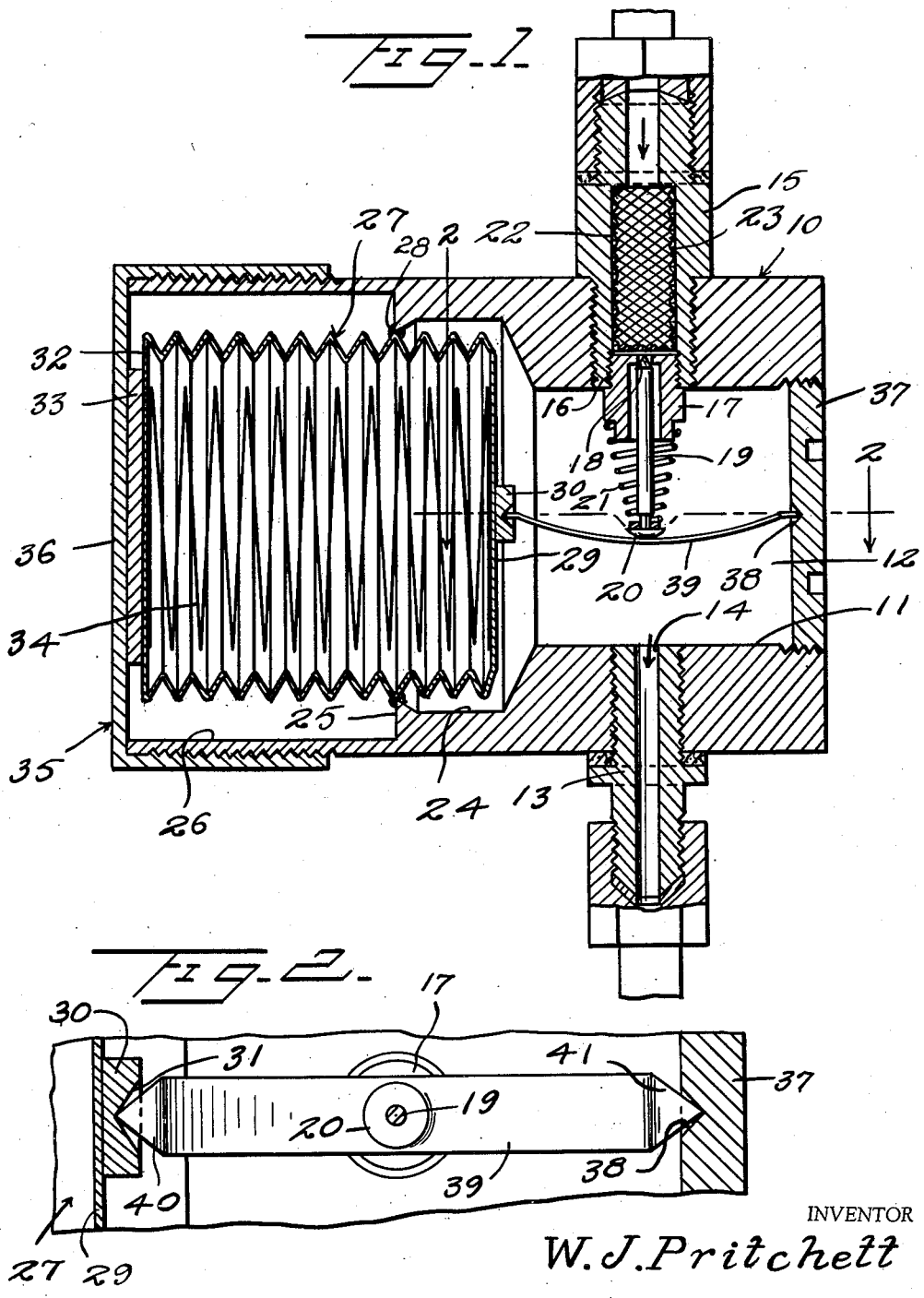

2,618,907

UNITED STATES PATENT OFFICE 2,618,907

AUTOMATIC SPRING-PRESSED NEEDLE EXPANSION VALVE

William J. Pritchett, Demopolis, Ala.

Application November 21, 1951, Serial No. 257,513

2 Claims. (Cl. 50—23)

This invention relates to an improved expansion valve.

An object of this invention is to provide an improved expansion valve which can be readily adjusted as to its operating cycles without removing or exposing any operating parts of the valve to the outside atmosphere and is leak-proof.

Another object of this invention is to provide an expansion valve which includes a valve housing having a spring-pressed needle valve therein which is normally biased to an open position, the needle valve being engaged by a resilient saddle which is spring-pressed to a bowed valve releasing position by means of a tensioned bellows which is sealed relative to the housing. The tension of the bellows is manually adjusted so as to provide for the selective opening and closing of the needle valve.

With the above and other objects in view, my invention consists in the arrangement, combination and details of construction disclosed in the drawings and specification, and then more particularly pointed out in the appended claims.

In the drawing:

Figure 1 is a cross section of an expansion valve constructed according to an embodiment of this invention.

Figure 2 is a fragmentary sectional view taken on the line 2—2 of Figure 1.

Referring to the drawing, the numeral 10 designates generally a cylindrical housing having a bore 11 which forms a pressure chamber 12. A nipple or connector 13 is threaded through the side of the housing 10 and is formed with a bore 14 which constitutes the outlet port for the housing 10. A diametrically disposed nipple or fitting 15 is threaded into the housing 10 and is formed at its inner end with an internally threaded bore 16 within which a valve seat member 17 is threaded. The valve seat member 17 is formed with a seat 18 against which a needle valve 19 is adapted to engage. The needle valve 19 is formed at its inner end with an enlarged head 20 against which the inner end of an expansion spring 21 engages, and the outer end of the spring 21 engages against the seat member 17 and constantly urges the needle valve 19 to an open position.

A screen or filter member 22 is disposed in a counterbore 23 formed in the fitting 15 so as to filter the fluid passing into the valve housing 10. The fitting 15 forms the intake fitting and is adapted to be connected to a source of fluid pressure supply. The housing 10 is formed with a counterbore 24 extending from one end of the bore or chamber 12, and the outer end of the counterbore 24 is defined by an annular inwardly extending rib or flange 25. The housing 10 also includes a second counterbore 26, which is larger in diameter than the counterbore 24. A resilient and expansible bellows 27 is disposed partly within the counterbore 26 and partly within the counterbore 24. The bellows 27 is sealed by means of solder, welding, or the like indicated at 28 being secured and sealed to the flange or rib 25. As shown in Figure 1 of the drawing, a minor portion of the bellows 27 is disposed within the counterbore 24 whereas the major portion of the bellows 27 is disposed within the counterbore 26. The bellows 27 includes an inner head or plate 29 which is sealed relative to the bellows and the head or plate 29 has fixed thereto a plug 30 formed with a conical seat 31. The outer end of the bellows 27 is closed by means of a plate 32 and a second plate 33, substantially heavier than the plate 32, is fixed to the outer side of plate 32. A bellows tensioning spring 34 is disposed within the bellows 27 bearing against the inner sides of plates 29 and 32. A bellows tensioning cap 35 is threaded about the housing 10 and includes a head 36 bearing against the plate 33. Inward threading of the cap 35 will tension spring 34 and bellows 27. A plug 37 is threaded into the housing 10 closing the end of chamber 12 oppositely from bellows 27.

Plug 37 is formed with a conical seat 38 at a point horizontally aligned with conical seat 31 and a resilient flat spring 39, formed with pointed opposite ends 40 and 41, is disposed between the plug 30 and the plug 37 with the ends 40 and 41 seated in the seats 31 and 38.

The spring or valve operator 39 extends lengthwise of chamber 12 and engages beneath the head 20 of the inner end of needle valve 19. When pressure in chamber 12 is of a predetermined degree, bellows 27 will contract and spring or valve operator 39 will straighten out and will overcome tension of spring 21 so as to thereby move needle valve 19 to a closed position. When pressure in chamber 12 decreases to a predetermined degree, bellows 27 will expand and spring 34 will cause spring 39 to bow away from needle valve 19, thereby releasing tension of spring 39 on needle valve 19 and permitting spring 21 to move needle valve 19 inwardly to an opened position. When pressure builds up in chamber 12, that portion of bellows 27 which projects into the counterbore 24 will be compressed, thereby permitting spring or valve operator 39 to straighten out toward its normal straight condition, and valve 19 will then be move to a closed position.

In view of the fact that needle valve 19 is forced open or closed by spring tension, the valve will operate accurately in any position, and the fact that the bellows is sealed at each end by the plates 29 and 32, the fluid passing through the valve housing will not enter the bellows or cause a corroding on the inside thereof which might affect the operation of the bellows and the tension of bellows operating spring 34, nor allow any moisture or other foreign matter to enter the bellows which would also affect the operation of the bellows and the tension of bellows operating spring 34.

I do not mean to confine myself to the exact details of construction herein disclosed, but claim all variations falling within the purview of the appended claims.

What is claimed is:

1. An expansion valve comprising a housing having a chamber therein, inlet and outlet connectors communicating with said chamber, an inwardly opening needle valve carried by said inlet connector, a spring normally urging said needle valve to open position, said housing having a counter-bore extending from said chamber, an annular flange at the outer end of said counter-bore, said housing also having a second counter-bore extending outwardly of said flange, a bellows fixed to said flange and disposed partly in one counter-bore and partly in the other counter-bore, end plates fixed to and closing the opposite ends of said bellows, an expansion spring disposed between said end plates, a recessed plug fixed to the inner one of said end plates, a threaded plug carried by said housing oppositely from said bellows and formed with a recess confronting said first named recess, a flat resilient valve operator seated at the opposite ends thereof in said recesses and extending across the inner end of said needle valve, and a cap threaded on said housing bearing against the outer one of said end plates for tensioning said second spring and said operator, pressure in said chamber beyond a predetermined degree compressing the inner portion of said bellows and permitting said operator to move said needle valve to a closed position against the tension of said first named spring.

2. An expansion valve comprising a housing having a chamber therein, inlet and outlet connectors communicating with said chamber, an inwardly opening needle valve carried by said inlet connector, a spring normally urging said needle valve to open position, said housing having a counter-bore extending from said chamber, an annular flange at the outer end of said counter-bore, said housing also having a second counter-bore extending outwardly of said flange, a bellows fixed to said flange and disposed partly in one counter-bore and partly in the other counter-bore, end plates fixed to and closing the opposite ends of said bellows, an expansion spring disposed between said end plates, a recessed plug fixed to the inner one of said end plates, a threaded plug carried by said housing oppositely from said bellows and formed with a recess confronting said first named recess, a flat resilient valve operator seated at the opposite ends thereof in said recesses and extending across the inner end of said needle valve, a wear plate fixed to the outer one of said end plates, and a cap threaded on said housing bearing against said wear plate for tensioning said second spring and said operator, pressure in said chamber beyond a predetermined degree compressing the inner portion of said bellows and permitting said operator to move said needle valve to a closed position against the tension of said first named spring.

WILLIAM J. PRITCHETT.

REFERENCES CITED

The following references are of record in the file of this patent:

UNITED STATES PATENTS

| Number | Name | Date |
| --- | --- | --- |
| 1,943,548 | Kellogg | Nov. 7, 1933 |
| 2,224,643 | Calini | Dec. 10, 1940 |